J. A. E. WOOLCOCK.
ADJUSTABLE DEVICE FOR USE IN CUTTING TENONS.
APPLICATION FILED NOV. 7, 1916.

1,270,912.

Patented July 2, 1918.

INVENTOR:
J. A. E. WOOLCOCK
BY:
ATTORNEY.

UNITED STATES PATENT OFFICE.

JOHN ALFRED ERNEST WOOLCOCK, OF HEIDELBERG, VICTORIA, AUSTRALIA.

ADJUSTABLE DEVICE FOR USE IN CUTTING TENONS.

1,270,912.　　　　　　　　Specification of Letters Patent.　　Patented July 2, 1918.

Application filed November 7, 1916. Serial No. 129,982.

*To all whom it may concern:*

Be it known that I, JOHN ALFRED ERNEST WOOLCOCK, a subject of the King of Great Britain, residing at Yarra street, Heidelberg, in the State of Victoria, Commonwealth of Australia, have invented a new and useful Adjustable Device for Use in Cutting Tenons; and I do hereby declare the following to be a full, clear, and exact description of the same.

This invention refers to means for cutting tenons by hand and comprises a device that is adjustable with a gage for setting the job and having means for maintaining the true and correct movement of the parts and for holding the same while the work is being done.

According to the invention, I provide two plates, preferably of iron, that overlap and are secured together. Attached to the main plate by a bolt is a slotted saw guide or block that can be moved to or from the main plate by a nut on the bolt. Attached to the slotted plate is a saw guide by which the cut may be regulated.

The invention also provides for a uniform and parallel movement of the slotted plate with the main plate and for the holding of the same when the gage has been set.

The accompanying drawings illustrate the invention, in which—

Figure 1:
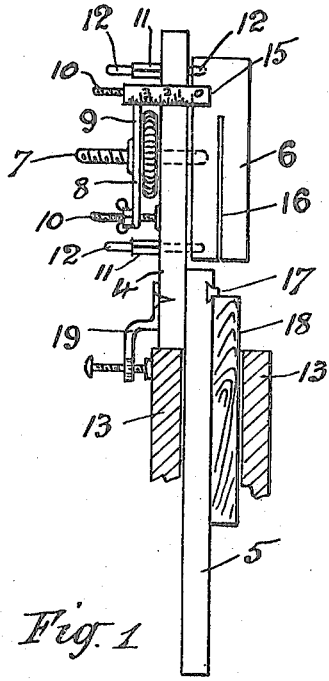
Figure 1 is a side elevation of the device.
Figure 2:
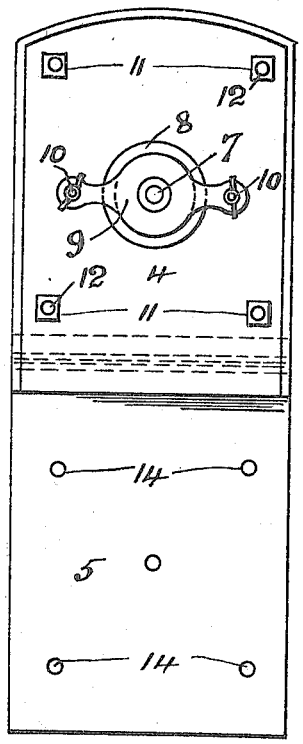
Fig. 2 is a plan of the same.

The main plate 4 has attached to it the extension or carrier plate 5. At the back of plate 4 is the slotted saw guide, or block 6 into which is fastened the bolt 7 that comes through 4 and carries the wheel nut 8 and clamp 9. The latter is held at its side by the bolts and wing nuts 10. Made integral with plate 4 are square outstanding bosses 11 that are hollow, the bore extending right through plate 4 into saw guide 6 as indicated by dotted lines, Fig. 1; studs 12 that are fixed in 6 come through the bosses and have a nice fit therein. The carrier plate 5 can be held in a vise 13 with the foot of plate 4 resting on the same or bolts or screws may be passed through the plate 5 to hold the device other than in a vise.

On the saw guide 6 is secured a plate 15 having a graduated scale the zero mark on which registers with the edge of plate 4 when 6 and 4 are drawn together. When such is so, the longitudinal slot 16 in the block 6 should be directly in line with the edge of plate 5. Arranged transversely in the latter near the top is a dovetailed removable bead 17 against which the job 18 will abut to prevent it coming too near the end of the slot 16. The saw used in making the cut is inserted in the slot 16 and thus by means of the bead the teeth of the same are clear of the slot when the cut is begun. The bead 17 may, if desired, be removed before making a cut, but in ordinary cases it will remain in the position shown.

The carrier member 5 and the job 18 are placed in the vise 13; the saw guide is then moved outward by turning the nut wheel 8 until the gage 15 indicates the width of the cut; the wing nuts on 10 are then tightened thereby clamping the nut wheel, and any number of tenons may then be cut from the guiding slot 16.

To facilitate handling and changing the tenon pieces 18, I have attached to the piece 4 a clamp 19 that closes on the vise 13. When, therefore, the vise is opened to remove a piece 18 the whole device will be maintained in position by means of the clamp and the insertion of a fresh piece 18 is facilitated. By this means much time will be saved, as in the case of tenoning each of the ends of a piece it will be necessary to cut it four times and consequently to move it a like number.

The saw guide 6 will be assisted in moving parallel with the plate 4, as the screw 7 is forced backward, by the members 12 sliding in the bosses 11 which are positioned near each corner of the plate.

Figure 3:
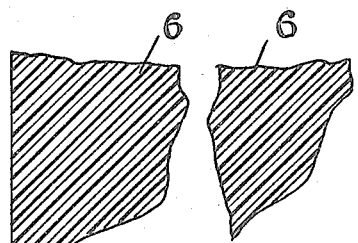
Fig. 3 is a view, showing, in fragmentary form the opposite inner faces (laid out) of the slot in the adjustable plate.

In order to insure the saw running easily in the narrow slot 16, I roughen the cheeks of the slot as indicated in Fig. 3, where, in fragmentary form, the slot is shown as opened out, the fragment at the left hand side illustrates one inner face of the slot and grooves on that face, while the fragment at the right illustrates the arrangement of grooves on the other inner face. If shallow V-shaped parallel grooves are made in each face at say an angle of 45° with the horizontal and the faces are in the same plane, the grooves on one side will be at an angle of 90° with those on the other side of the slot when the faces are in opposite positions; thus the end in view will be attained.

To insure the correct alinement of the saw guide with the main plate the clearance of the bolt 7 in the main plate should be the least possible and the screw thread upon the bolt is preferably square. The breadth of the slot 16 is such that the ordinary hand saw used to make the cut will nicely fit therein: the roughened surfaces in the slot will greatly assist in the easy movement of the saw in the slot.

Having now described my invention, what I claim as new and desire to secure by Letters Patent is—

1. A hand tenoning device comprising a main plate; a holding plate against which the work is placed, attached to the main plate; a saw guide mounted upon the main plate to slide transversely thereof and above the holding plate; and means for moving the saw guide.

2. A hand tenoning device comprising a main plate; a holding plate against which the work is placed, attached to the main plate; a saw guide mounted upon the main plate to slide transversely thereof and above the holding plate; means for moving the saw guide; and a dovetailed removable bead transversely disposed in and near the top of the holding plate.

3. In a hand tenoning device, a main plate; a holding plate attached to the main plate against which the work is placed; a saw guide mounted upon and movable with respect to said main plate, and having a narrow slot therein provided with roughened faces; and means for moving said saw guide.

In testimony whereof I affix my signature in presence of a witness.

JOHN ALFRED ERNEST WOOLCOCK.

Witness:
R. N. NEWTON.

Copies of this patent may be obtained for five cents each, by addressing the "Commissioner of Patents, Washington, D. C."